United States Patent [19]

Wilson

[11] Patent Number: 4,721,283
[45] Date of Patent: Jan. 26, 1988

[54] VENT VALVE CONSTRUCTION FOR A STORAGE TANK, STORAGE TANK CONTAINING THE SAME AND METHOD OF MAKING THE SAME

[75] Inventor: Fred A. Wilson, Middletown, Ohio
[73] Assignee: Dover Corporation, New York, N.Y.
[21] Appl. No.: 938,852
[22] Filed: Dec. 8, 1986
[51] Int. Cl.⁴ ............................................. F16K 31/122
[52] U.S. Cl. ..................................... 251/63.4; 251/63.6; 251/144
[58] Field of Search ...................... 251/63.4, 63.6, 144

[56] References Cited

U.S. PATENT DOCUMENTS

| | | | |
|---|---|---|---|
| 3,123,088 | 3/1964 | Marx | 251/144 X |
| 3,770,011 | 11/1973 | Muehl | 251/144 X |
| 3,865,132 | 2/1975 | Wiegand | 251/63.4 X |

Primary Examiner—Robert G. Nilson
Attorney, Agent, or Firm—Kinney & Schenk

[57] ABSTRACT

A vent valve construction, storage tank containing the same and method of making the same are provided, the vent valve construction having a body member provided with a tubular portion that has opposed open ends one of which is adapted to be disposed in the storage compartment of the storage tank and the other of which is adapted to be accessible from the exterior of the storage tank wall, the valve member of the vent valve construction having a stem projecting through the one open end of the tubular portion to operatively interconnect the valve member to a piston unit disposed in the tubular portion and a removable closure means closing the other open end of the tubular portion.

23 Claims, 9 Drawing Figures

VENT VALVE CONSTRUCTION FOR A STORAGE TANK, STORAGE TANK CONTAINING THE SAME AND METHOD OF MAKING THE SAME

BACKGROUND OF THE INVENTION

1. Field of the Invention

This invention relates to a new vent valve construction for a storage tank means and to a method of making such a valve construction, as well as to a storage tank means utilizing such a vent valve construction.

2. Prior Art Statement

It is known to provide a vent valve construction for a storage tank that has a wall means defining a storage compartment therein and an opening therethrough leading from the exterior of the wall means to the storage compartment, the vent valve construction comprising a body member having an annular flange portion for engaging against the wall means around the opening thereof on the exterior thereof and an annular valve seat portion for passing through the opening and being disposed in the storage compartment, a movable valve member carried by the body portion for opening and closing the valve seat portion to and from the storage compartment, the body member having a tubular portion substantially concentrically disposed in the flange portion and the valve seat portion, piston means operatively interconnected to the valve member and being disposed in the tubular portion to define a pressure chamber therein, and spring means operatively associated with the valve member to tend to maintain the valve member in its closed position with the valve seat portion in opposition to the force of any fluid pressure directed to the pressure chamber and tending to move the valve member to its open position.

For another type of vent valve construction, see the U.S. Pat. No. 4,266,574 to Tilling.

SUMMARY OF THE INVENTION

It is one feature of this invention to provide a new vent valve construction wherein the same can be readily made from relatively few parts in a simple and effective manner while permitting access to the working parts of the vent valve construction when the same is being utilized with a storage tank means.

In particular, it was found according to the teachings of this invention that the tubular portion of the body member of the vent valve construction can be formed with opposed open ends one of which is adapted to be disposed in the storage compartment of the storage tank means and the other of which is adapted to be accessible from the exterior of the wall means and be closed by a readily removable closure means.

For example, one embodiment of this invention provides a vent valve construction for a storage tank that has a wall means defining a storage compartment therein and an opening therethrough leading from the exterior of the wall means to the storage compartment, the vent valve construction comprising a body member having an annular flange portion for engaging against the wall means around the opening thereof on the exterior thereof and an annular valve seat portion for passing through the opening and being disposed in the storage compartment, a movable valve member carried by the body portion for opening and closing the valve seat portion to and from the storage compartment, the body member having a tubular portion substantially concentrically disposed in the flange portion and the valve seat portion, piston means operatively interconnected to the valve member and being disposed in the tubular portion to define a pressure chamber therein, and spring means operatively associated with the valve member to tend to maintain the valve member in its closed position with the valve seat portion in opposition to the force of any fluid pressure directed to the pressure chamber and tending to move the valve member to its open position, the tubular portion having opposed open ends one of which is adapted to be disposed in the storage compartment and the other of which is adapted to be accessible from the exterior of the wall means, the valve member having a stem projecting through the one open end of the tubular portion to operatively interconnect the valve member to the piston means and removable closure means closing the other open end of the tubular portion.

Accordingly, it is an object of this invention to provide a new vent valve construction for a storage tank that has a wall means defining a storage compartment therein and an opening therethrough leading from the exterior of the wall means to the storage compartment, the vent valve construction of this invention having one or more of the novel features of this invention as set forth above or hereinafter shown or described.

Another object of this invention is to provide a new storage tank means utilizing such a vent valve construction, the storage tank means of this invention having one or more of the novel features of this invention as set forth above or hereinafter shown or described.

Another object of this invention is to provide a new method of making such a vent valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a vent valve construction for a tank truck or the like, it is to be understood that the various features of this invention can be utilized singly or in various combinations thereof to provide a vent valve construction for other types of storage tank means as desired.

Therefore, this invention is not to be limited to only the embodiments illustrated in the drawings, because the drawings are merely utilized to illustrate one of a wide variety of uses of this invention.

Figure 1:
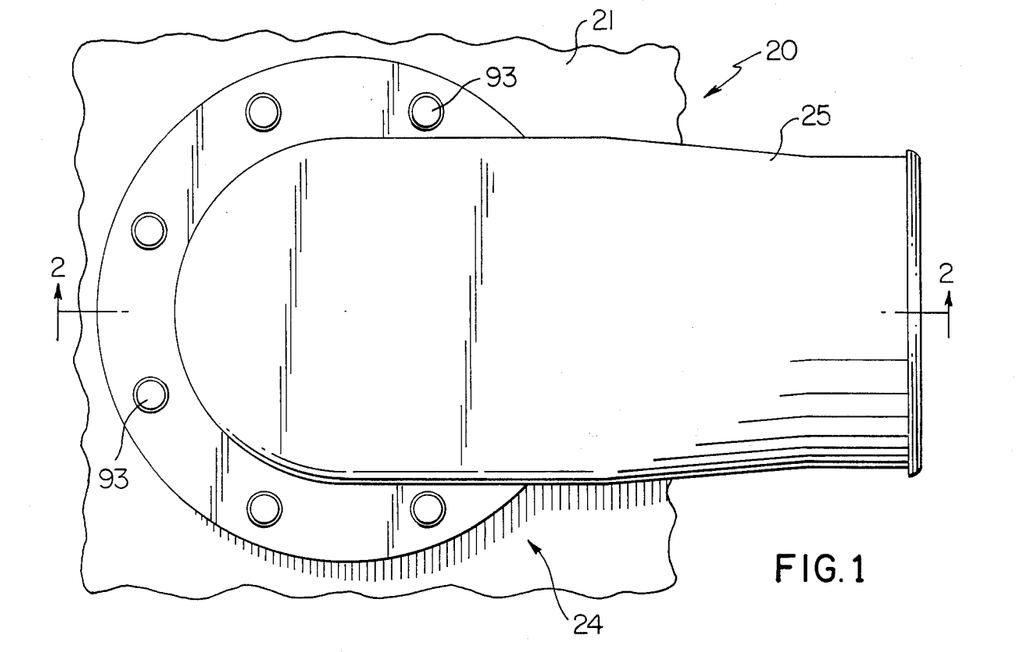
FIG. 1 is a fragmentary top view of the storage tank means of this invention carrying the new vent valve construction of this invention.
Figure 2:
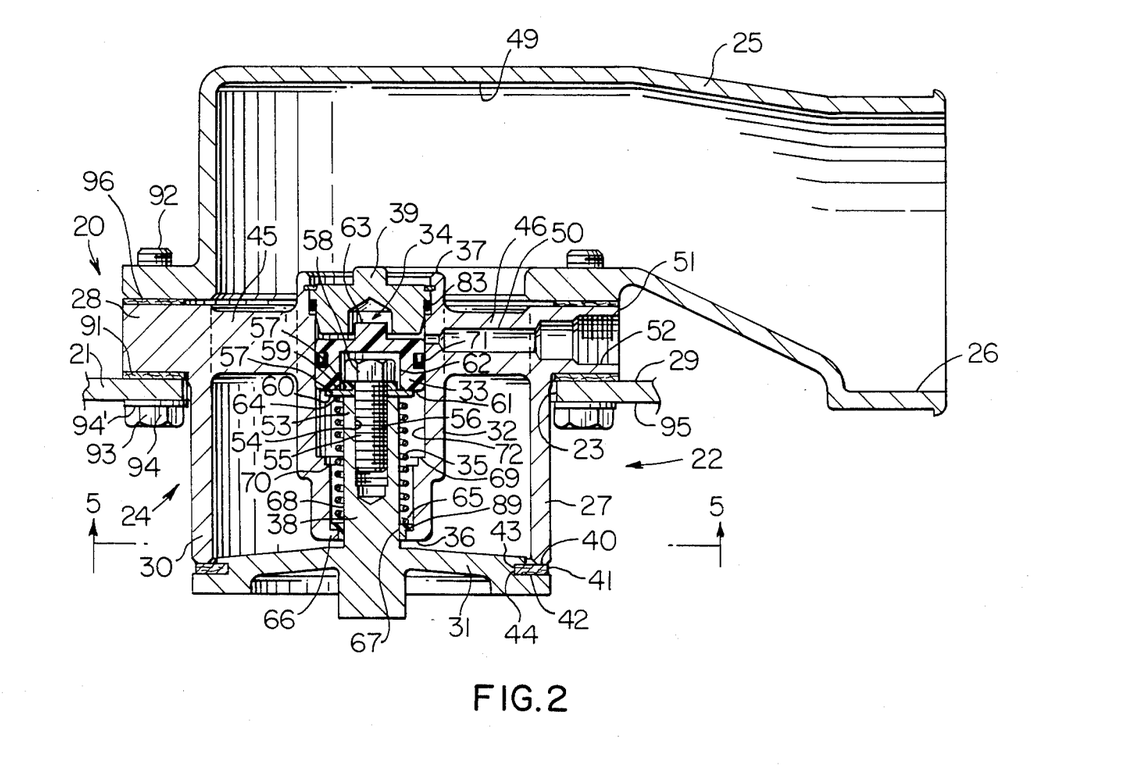
FIG. 2 is a fragmentary cross-sectional view taken on line 2—2 of FIG. 1.

Referring now to FIGS. 1 and 2, the storage tank means of this invention is generally indicated by the reference numeral 20 and comprises a wall means 21 defining a storage compartment 22 therein and having an opening 23 therethrough leading from the exterior of the wall means 21 to the storage compartment 22 in a conventional manner.

A vent valve construction of this invention is generally indicated by the reference numeral 24 and is carried by the wall means 21 of the storage tank means 20 in a manner hereinafter set forth, the vent valve means 24 being adapted to vent the vapors of the volatile fluid, such as gasoline being directed into the storage compartment 22 or being dispensed from the storage compartment 22 for reasons well known in the art, with such vapors being directed into a suitable hood 25 carried by the vent valve means 24 in a manner hereinafter set forth and being collected from an open end 26 of the hood means 25 also in a manner well known in the art whereby a further description of the vapor recovery process and the reasons for a vent valve arrangement are not necessary.

The new vent valve construction 24 of this invention, in general, comprises a body member 27 having an annular flange portion 28 for engaging against the wall means 21 around the opening 23 thereof on the exterior side 29 thereof and an annular valve seat portion 30 passing through the opening 23 and being disposed in the storage compartment 22. A movable valve member 31 is carried by the body portion 27 for opening and closing the valve seat portion 30 to and from the storage compartment 22. The body member 27 has a tubular portion 32 substantially concentrically disposed in the flange portion 28 and the valve seat portion 30. Piston means 33 is operatively interconnected to the valve member 31 and is disposed in the tubular portion 32 to define a pressure chamber 34 therein. Spring means 35 is operatively associated with the valve member 31 to tend to maintain the valve member 31 in its closed position with the valve seat portion 30 in opposition to the force of any fluid pressure directed to the pressure chamber 34 and tending to move the valve member 31 to its open position in a manner hereinafter set forth.

The tubular portion 32 of the body member 27 has opposed open ends 36 and 37 one 36 of which is adapted to be disposed in the storage compartment 22 and the other 37 of which is adapted to be accessible from the exterior of the wall means 21. The valve member 31 has a stem 38 projecting through the one end 36 of the tubular portion 32 to operatively interconnect the valve member 31 to the piston means 33. A removable closure means 39 closes the other open end 37 of the tubular portion 32 in a manner hereinafter set forth.

The annular valve seat portion 30 of the body member 27 defines an annular valve seat 40 at the outer or lower end thereof which is opened and closed by an annular flexible sealing member 41 carried by a valve member 31, the annular flexible sealing member 41 being disposed against an annular shoulder means 42 of the valve member 31 and having an inner peripheral edge portion 43 received in an annular slot 44 of the valve member 31 as illustrated.

Figure 4:
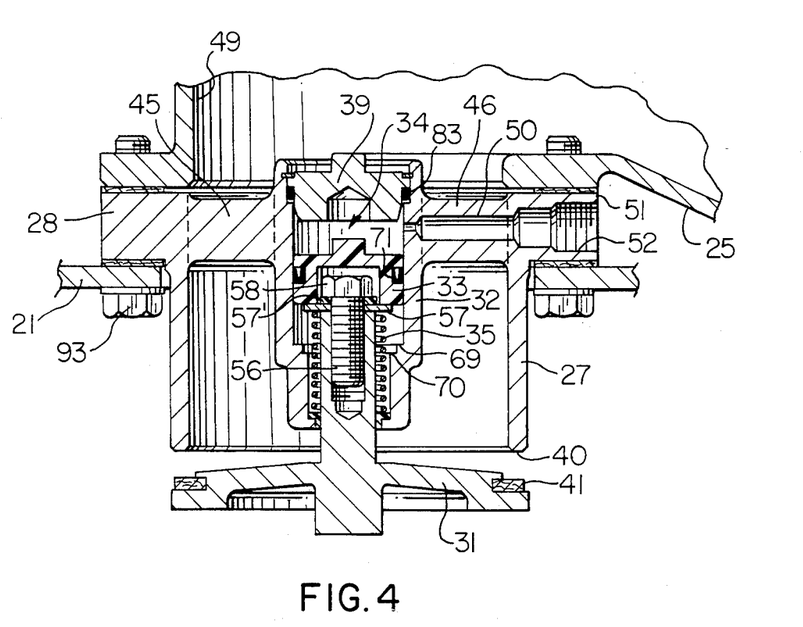
FIG. 4 is a fragmentary view similar to FIG. 2 and illustrates the vent valve construction having the valve member thereof in an open condition thereof.
Figure 5:
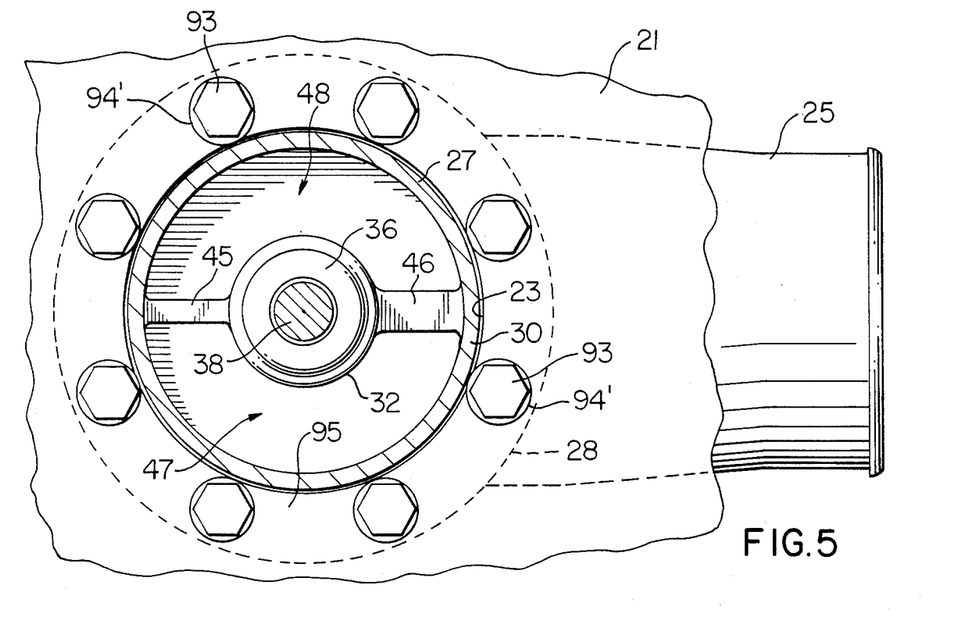
FIG. 5 is a fragmentary cross-sectional view taken on line 5—5 of FIG. 2.

The body member 27 of the vent valve construction 24 includes a plurality of web-like portions 45 and 46 that interconnect the tubular portion 32 to the annular flange portion 28 and define a pair of passages 47 and 48, FIG. 5, therebetween to fluidly interconnect the valve seat 40 with the interior 49 of the hood 25 when the valve member 31 is disposed in an open condition, such as is illustrated in FIG. 4.

The portions 28, 30, 32, 45 and 46 of the body member 27 can be integral and homogeneous whereby the body member 27 comprises a one-piece member which can be formed of any suitable material and in any suitable manner, such as being a casting of aluminum.

Likewise, the valve member 31 and closure member 39 can be formed of any suitable material and in any suitable manner, such as being aluminum as illustrated in the drawings.

One of the web-like portions 46 of the body member 27 has an opening or passage 50 extending therethrough and leading from the external peripheral surface 51 of the annular flange portion 28 to the pressure chamber 34 at the interior of the tubular portion 32 thereof whereby the passage 50 can be utilized to direct fluid under pressure to the pressure chamber 34 to act on the piston member 33 and drive the same downwardly in FIG. 2 in the manner illustrated in FIG. 4 in opposition to the force of the compression spring 35 to open the valve member 31 away from the valve seat 40 as illustrated in FIG. 4 and in a manner hereinafter set forth, the passage 50 being internally threaded at its outer end 52 in order to permit a suitable hose or fitting to be coupled thereto to direct the fluid under pressure to the chamber 34. Thus, it can be seen that the interconnection to the passage or opening 50 of the vent valve construction 24 is an external connection and thereby on the exterior side 29 of the wall means 21 so as to be readily accessible to the operator of the storage tank means 20.

The stem 38 of the valve member 31 has a free end 53 that is interrupted by a threaded bore 54 so that a threaded shank portion 55 of a fastening member 56 can be threaded therein and thereby hold a washer 57 against the end 53 of the stem 38, a suitable lock washer 57' being disposed intermediate the flat washer 57 and the enlarged head 58 of the fastening member 56. In this manner, the flat washer 57 has the opposed sides 59 and 60 thereof defining annular shoulder means of the valve member 31 that extend radially outwardly from the stem 38 and the head 58 of the fastening member 56 for a purpose now to be described.

While the washers 57 and 57' and fastening member 56 can be formed of any suitable material, one working embodiment thereof comprises stainless steel, the spring 35 likewise being formed of stainless steel.

The piston member 33 comprises a part separate from the stem 38 of the valve member 31 so as to allow for misalignment therebetween and has a lower flat surface 61 that is interrupted by a closed end recess or opening 62 which is adapted to fully telescopically receive the enlarged head 58 of the fastening member 56 therein so that the end surface 61 of the piston member 33 actually comprises an annular shoulder means 61 which is adapted to be engageable against the annular shoulder means 59 provided by the washer 57 of the stem 38. In this manner, when the pressure chamber 34 is pressurized with a pressure fluid, the pressure fluid exerts a downward force on the upper surface 63 of the piston member 33 and drives the same downwardly so that the annular shoulder means 61 thereof abuts against the annular shoulder means 59 of the stem 38 and drives the valve member 31 downwardly therewith in opposition to the force of the compression spring 35 to open the valve member 31 away from the valve seat 40.

In particular, the spring means 35 comprises a coiled compression spring having one opposed end 64 thereof abutting against the annular shoulder means 60 of the stem 38 and the other end 65 thereof effectively bearing against an annular shoulder means 66 of the tubular member 32 that defines the lower open end 36 thereof. In this manner, the force of the compression spring 35 tends to drive the valve member 31 upwardly and is still under at least a slight compression thereof when the valve member 31 is disposed in its closed condition against the valve seat 40 as illustrated in FIG. 2.

In order to support the axial movement of the stem 38 through the lower open end 36 of the tubular portion 32 of the body member 27, a suitable annular bearing 67 can be provided at the open end 36 of the tubular portion 32 as illustrated, the bearing means 67 being disposed in sliding engagement with the external peripheral surface 68 of the stem 38. The bearing member 67 can be formed of any suitable material and in the embodiment illustrated in the drawings, the same comprises a plastic material, such as acetal.

In order to limit downward movement of the piston member 33 in the tubular member 32, the tubular member 32 is provided with a pair of internal stepped annular shoulder means 69 and 70 which are adapted to be respectively engaged by the annular shoulder means 61 of the piston member 33 and the annular shoulder means 60 of the stem 38 when the same are moved downwardly thereagainst. In this manner, the opening movement of the valve member 31 away from the valve seat 40 is controlled by the stops or shoulder means 69 and 70 of the tubular portion 32.

In order to seal the chamber 34 during the axial movement of the piston member 33, the piston member 33 carries an annular sealing means 71 which engages against the internal peripheral surface 72 of the tubular portion 32 during the axial movement of the piston member 33 therein, the sealing member 71 being disposed in an annular groove 73 formed in the external peripheral sidewall 74 of the piston member 33.

While the annular sealing member 73 can comprise any suitable structure and be formed of any suitable material, the embodiment thereof illustrated in the drawings comprises a polymeric U-cup packing member having a U-shaped cross-sectional configuration defined by two legs 75 and 76 so arranged so that the leg 76 is urged into sealing relation with the internal peripheral surface 72 of the tubular portion 32 by the fluid pressure in the chamber 34 in a manner well known in the art. Of course, the sealing member for the piston member 33 could be a conventional O-ring-like member, if desired.

Also, while the piston member 33 could be formed of any suitable material, the embodiment thereof illustrated in the drawings comprises plastic material.

Figure 3:
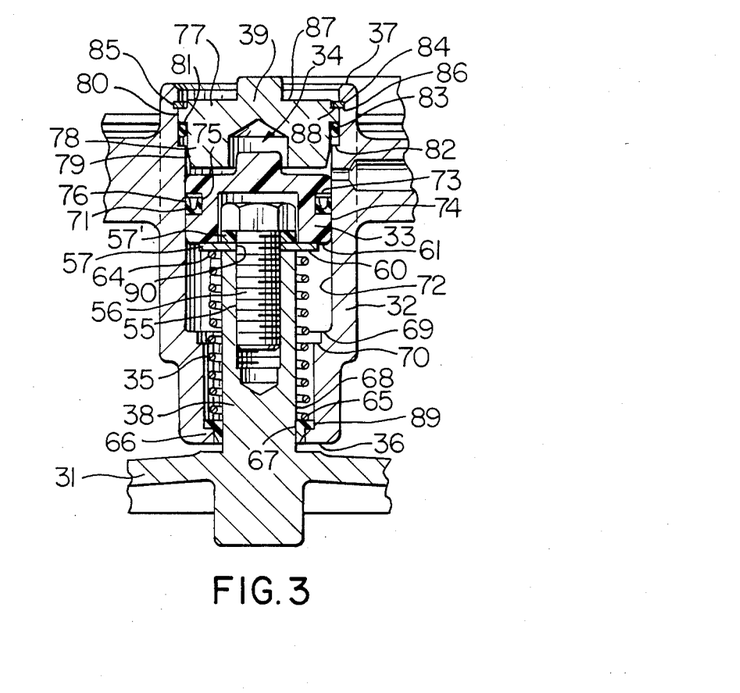
FIG. 3 is a fragmentary enlarged view of the tubular portion of the vent valve construction of FIG. 2.

The closure member 39 has an upper disc-like portion 77 and a lower projecting portion 78 provided with an external peripheral sidewall 79 that is inwardly stepped relative to the external peripheral sidewall 80 of the disc-like portion 77 thereof whereby the peripheral sidewalls 79 and 80 of the closure member 34 define an annular shoulder means 81 therebetween which is adapted to face an internal annular shoulder means 82 of the tubular portion 32 and trap an annular sealing member 83 therebetween which seals the closure member 39 in the open end 37 of the tubular portion 32 while permitting slight axial movement of the closure member 39 in the tubular member 32 within certain limits that are defined by the annular shoulder means 81 of the tubular portion 32 and a removable annular shoulder means 84 of the tubular portion 32 that comprises a split C-ring that has its outer peripheral edge means 85 normally received in an annular groove 86 formed in the open end 37 of the tubular portion 32 as illustrated in FIG. 3.

An upper surface 87 of the closure member 39 has a recess 88 formed therein and is adapted to receive the annular shoulder means or C-ring 84 therein when the closure member 39 is driven axially upwardly against the annular shoulder means 84 by pressure existing in the chamber 34 as illustrated in FIG. 3.

Figure 6:
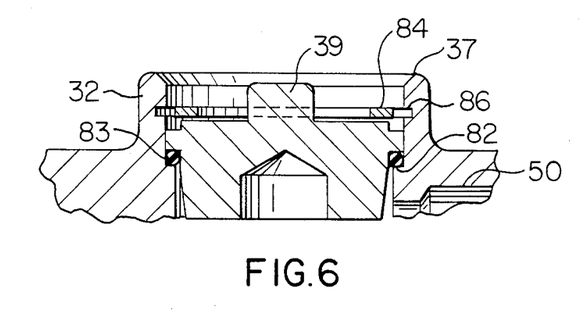
FIG. 6 is a fragmentary enlarged view of part of the tubular portion of the vent valve construction of this invention and illustrates one of the steps in the method of this invention for making the vent valve construction of this invention.

However, in order to remove the closure member 39 from the tubular portion 32, the closure member 39 can be moved axially downwardly as illustrated in FIG. 6 until the lower annular shoulder means 82 stops such movement. At this time, the C-ring 84 can be moved or collapsed radially inwardly to clear the annular groove 86 of the tubular body portion 32 as illustrated in FIG. 6 so as to remove the C-ring 84 out through the end 37 of the tubular portion 32. This then permits the closure member 39 to also be removed out through the open end 37 of the tubular portion 32.

Thus, it can be seen that the vent valve construction 24 of this invention can be formed of a relatively few simple parts in a relatively simple manner by the method of this invention.

In particular, with the bearing means 67 in place, the stem 38 of the valve member 31 can be inserted through the open end 36 of the tubular portion 32 and then the compression spring 35 can be telescoped over the stem 38 by inserting the spring 35 through the other open end 37 of the tubular portion 32 until the end 65 thereof abuts against an outwardly directed flange 89 of the bearing member 67 and thereby be effectively disposed against the internal annular shoulder 66 of the tubular portion 32. Thereafter, the flat washer 57 is inserted through the open end 37 and disposed against the end 64 of the spring 35. Thereafter, the threaded fastening member 56 together with the lock washer 57' has its shank portion 55 inserted through a central opening 90 of the wasker-like member 57 and is threaded into the threaded bore 54 of the stem 38 whereby the other end 64 of the compression spring 35 is moved downwardly with the washer 57 until the washer 57 engages against the end 53 of the stem 38. This places the spring 35 under compression even when the valve member 31 is disposed against the valve seat 40 as illustrated in FIG. 2 and fastens the washer 57 to the stem 38.

Thereafter, the piston member 33, along with its annular sealing means 71, is inserted through the open end 37 of the tubular portion 32 to have its annular shoulder means 61 abut against the washer 57. The closure member 39, along with its annular sealing member 83, is then inserted into the open end 37 of the tubular portion 32 and the same is moved axially downwardly to the position illustrated in FIG. 6 so that the C-ring 84 can be disposed in its inwardly collapsed condition of FIG. 6 to be released and thereby be outwardly expanded into the annular groove 86 to lock the closure member 39 in the tubular portion 32 of the body member 27.

The thus completed vent valve construction 24 of this invention can then be assembled to the wall means 21 of the storage tank 20 by inserting the valve seat portion 30 thereof through the opening 23 so that the annular flange portion 28 will in effect be disposed against exterior side 29 of the wall means 21. However, a suitable sealing gasket 91 can be disposed between the annular portion 28 of the body member 27 and the side 29 of the wall 21.

In order to secure the annular flange portion 28 of the body portion 27 to the wall 21, the annular flange portion 28 has a plurality of openings (not shown) passing therethrough and receiving the respective shank portions 92 of threaded fastening members 93 therethrough which have the enlarged heads 94 thereof and sealing washers 94' engage against the underside 95 of the wall means 21 and be threadedly received in suitable threaded openings (not shown) passing through the hood 25 so that the hood 25 is being secured to the annular flange portion 28 of the vent valve construction 24 at the same time that the vent valve construction 24 is being secured to the wall means 21 of the storage tank means 20. Also, a suitable gasket means 96 is disposed between the annular flange portion 28 of the vent valve construction 24 and the hood 25 to seal the same together as illustrated.

The fastening members 93 can comprise stainless steel and the sealing washers 94' can comprise cadmium plated steel while the hood 25 can comprise aluminum. Of course other suitable material or materials can be utilized, if desired.

With the vent valve construction 24 thus mounted in the manner illustrated in FIG. 2, it can be seen that a suitable external pressure line can be attached to the passage 50 in the body portion 27 of the vent valve construction 24 so as to direct pressure fluid to the pressure chamber 34 each time it is desired to open the valve member 31 so that the pressure fluid in the chamber 34 will drive the piston member 33 downwardly and thereby carry the valve member 31 therewith in opposition to the force of the compression spring 35 and open the valve member 31 away from the valve seat 40 as illustrated in FIG. 4.

Thereafter, when it is desired to close the valve member 31, the fluid pressure from the chamber 34 is exhausted in a conventional manner so that the force of the compression spring 35 will drive the valve member 31 upwardly to close against the valve seat 40 as illustrated in FIG. 2.

The vapors that pass through the opened valve member 31 are directed out through the annular passages 47 and 48 defined by the web-like portions 45 and 46 into the hood 25 to be exhausted out of the end 26 thereof to the desired collecting structure as is well known in the art.

While the vent valve construction 24 of this invention has been previously described as being secured to the wall means 21 of the storage tank 20 by the threaded fastening members 93, it is to be understood that the same could be secured to the wall means in any other suitable manner.

Figure 7:
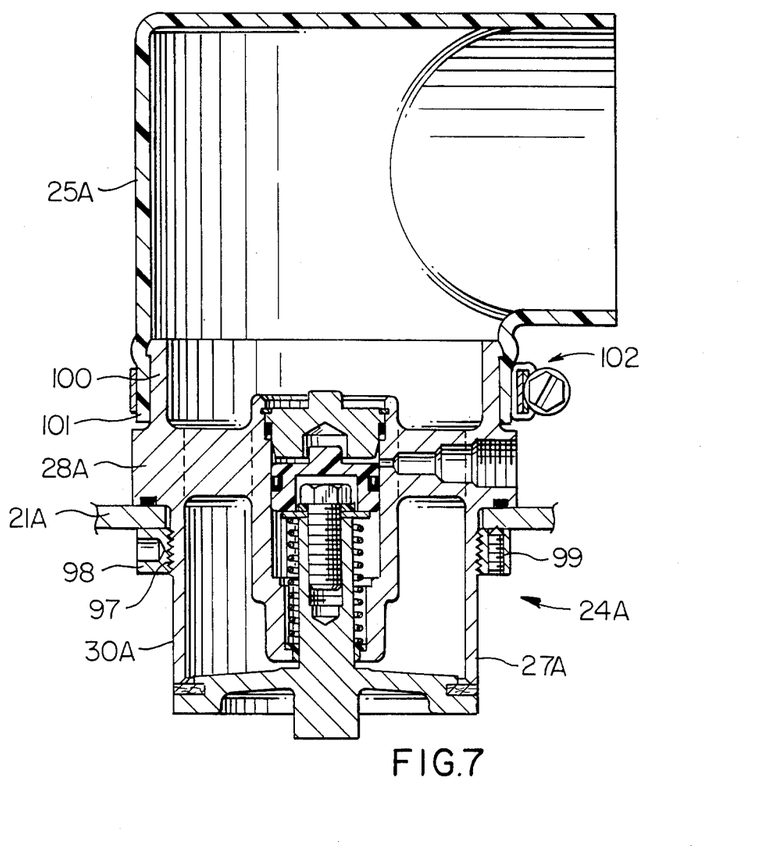
FIG. 7 is a view similar to FIG. 2 and illustrates another embodiment of this invention.

For example, reference is now made to FIG. 7 wherein another vent valve construction of this invention is generally indicated by the reference numeral 24A and parts thereof similar to the vent valve construction 24 previously described are indicated by like reference numerals followed by the reference letter "A".

As illustrated in FIG. 7, the valve seat portion 30A of the body member 27A of the vent valve construction 24A has an externally threaded part 97 on which an internally threaded retaining ring 98 is adapted to be threaded and sandwich the wall means 21A between the retaining ring 98 and the flange portion 28A of the vent valve construction 24A. If desired, a set screw 99 can be utilized to lock the retaining ring 98 in its fastening position.

Also, it can be seen in the embodiment illustrated in FIG. 7 that the annular flange portion 28A of the body member 27A has an upwardly directed tubular portion 100 over which a tubular end 101 of a plastic hood member 25A can be telescoped and then held in place by a suitable worm clamp means 102 as illustrated.

Figure 8:
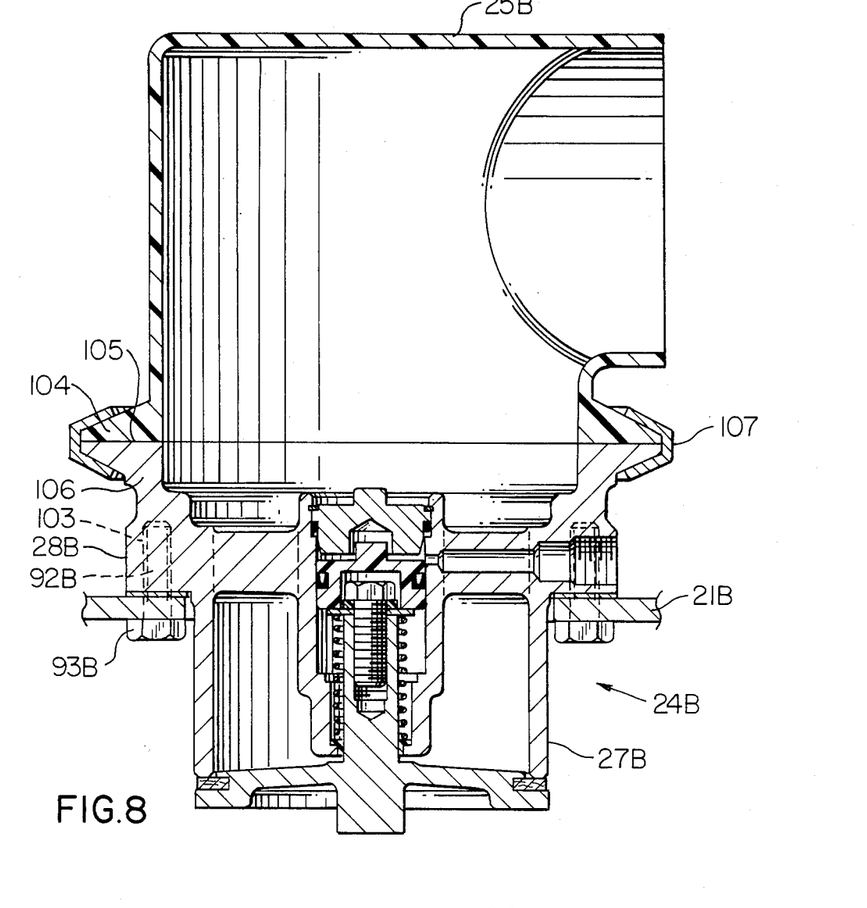
FIGS. 8 and 9 are respectively views similar to FIG. 7 and respectively illustrate other embodiments of this invention.

Another vent valve construction of this invention is generally indicated by the reference numeral 24B in FIG. 8 and parts thereof similar to the vent valve construction 24 are indicated by like reference numerals followed by the reference letter "B."

As illustrated in FIG. 8, the annular flange portion 28B of the body member 27B is directly secured to the tank wall means 21B by the fastening members 93B having the shank portions 92B thereof threadedly received into threaded openings 103 in the annular flange portion 28B thereof.

In addition, the hood 25B has its annular end 104 disposed against an annular end surface 105 of an upstanding tubular part 106 of the annular flange portion 28B and is clamped thereto by an annular clamping member 107 as illustrated.

Figure 9:
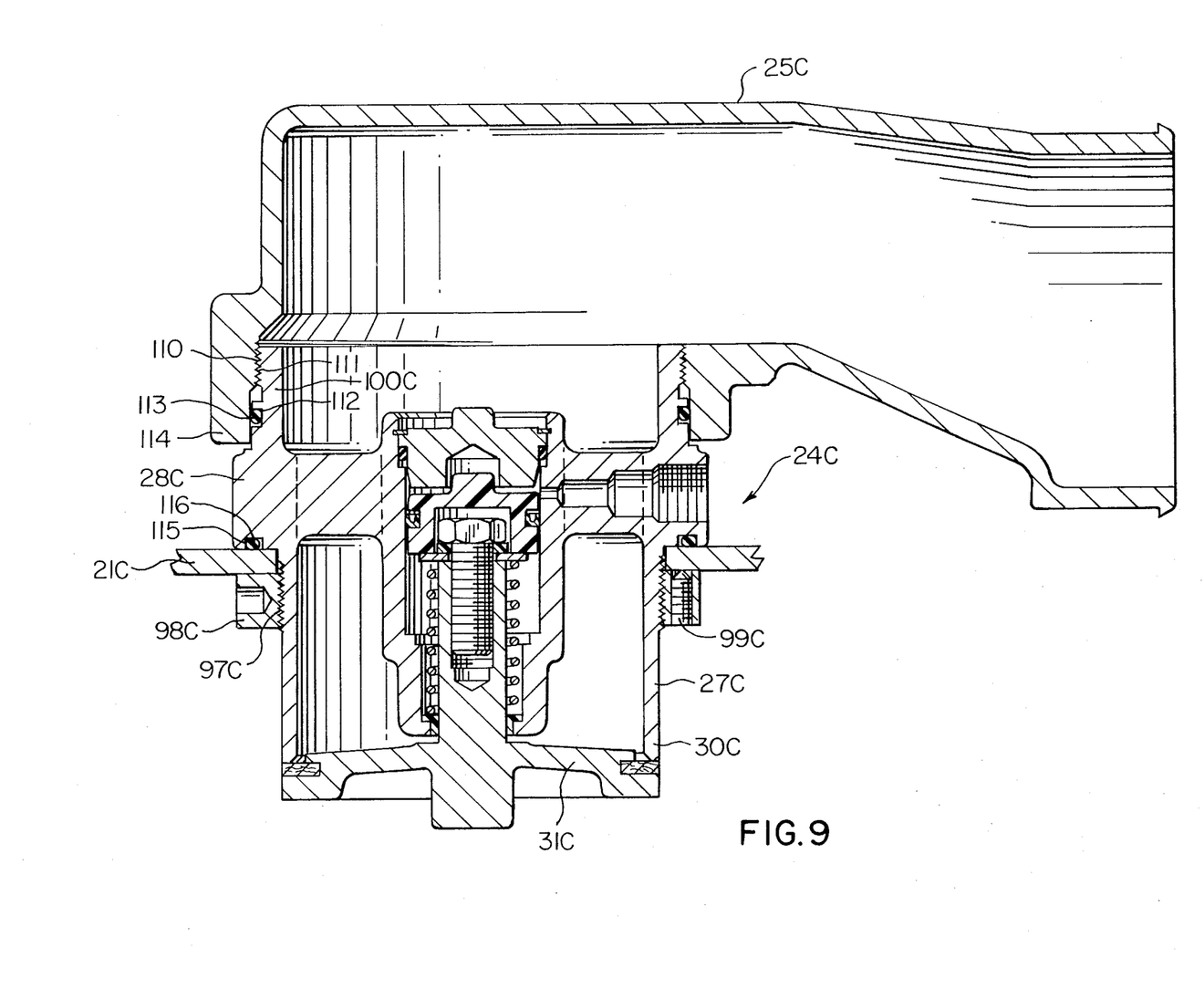

Another vent valve construction of this invention is generally indicated by the reference numeral 24C in FIG. 9 and parts thereof similar to the vent valve constructions 24, 24A and 24B previously described are indicated by like reference numerals followed by the reference letter "C."

As illustrated in FIG. 9, the annular flange portion 28C of the vent valve construction 24C is secured to the tank wall means 21C by the internally threaded annular member or retaining ring 98C that is threaded on the threaded part 97C of the annular valve seat portion 30C of the body member 27C and sandwiches the wall means 21C between the retaining ring 98C and the annular flange portion 28C of the body member 27C in substantially the same manner as the vent valve construction 24A of FIG. 7 previously described, the retaining ring 98C being retained in its locking position by the set screw 99C.

The annular flange portion 28C of the body member 27C has an upwardly directed tubular portion 100C that is provided with external threads 110 on the outer end thereof. In this manner, a hood member 25C can be detachably fastened to the upwardly directed tubular portion 100C of the annular flange portion 28C of the body member 27C by threading an internally threaded part 111 thereof onto the externally threaded part 110 of the tubular portion 100C as illustrated, the hood member 25C having an annular depending skirt portion 114 adapted to overlap the tubular portion 100C of the body member 24C and be sealed thereto by an annular sealing O-ring 113 that is partially disposed in an annular groove 112 in the tubular portion 100C of the body member 27C as illustrated.

While the hood member 25C illustrated in FIG. 9 comprises a metallic hood member, it is to be understood that the hood means 25C could be formed of any suitable material as desired.

In addition, while the hood means 25C is shown as being threaded onto the body member 24C of the vent valve construction 24C, such hood member 25C can be removed therefrom and be replaced by another hood means, such as an all polymeric hood means as illustrated in FIG. 7, with such hood means being secured to the tubular portion 100C either by a threaded relation therewith or by an external clamp means or other means as desired.

Therefore, it can be seen that the vent valve construction 24C of FIG. 9 does not utilize separate fastening means to fasten the body member 27C to the tank wall means 21C, and the vent valve construction 24C also does not utilize auxiliary fastening means to fasten the hood 25C thereto.

The annular flange portion 28C of the body member 24C is provided with an annular groove 115 therein that faces the retaining ring 98C and partially receives a sealing O-ring 116 therein which seals the body member 27C to the storage tank wall means 21C as illustrated in FIG. 9, such sealing arrangement also being provided for the vent valve construction 24A of FIG. 7 as illustrated.

Therefore, it can be seen that various modifications can be made to the vent valve construction of this invention to permit the same to be attached to a particular hood arrangement as well as to be attached to a particular mounting arrangement on the wall means of a storage tank or the like.

In any event, it can be seen that this invention not only provides a new vent valve construction for a storage tank or the like and to a new method of making such a vent valve construction, but also this invention provides a new storage tank means utilizing such a new vent valve construction.

At present, the vent valve construction of this invention, as previously described, is being utilized solely as a vapor valve for a gasoline delivery truck whereby it can be seen that the poppet valve member 31 thereof will be disposed inside the gasoline compartment and closes with pressure created within the gasoline compartment and acting thereagainst so that should the gasoline truck turn over, the gasoline therein will act in a direction to hold the poppet valve member 31 in its closed condition against its valve seat 40 whereby gasoline will not leak out through such vent valve construction and cause a hazardous condition.

In addition, air under pressure can be directed to the chamber 34 of the vent valve construction of the invention to open the poppet valve member 31 relative to the valve seat 40 so that when the gasoline truck is being bottom loaded with gasoline in a conventional manner the vapors thereof inside the compartment 22 escape through the open poppet valve seat 40. Also, when the gasoline in the compartment 22 is being dispensed to a filling station in a conventional manner, the open valve member 31 permits air to enter into the compartment 22 to replace the volume void being created therein through the dispensed gasoline.

Also, because the air line of the truck to the passage 50 is external to the gasoline compartment 22, the operator can readily detect whether or not any leaks are present in the air line connection.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a vent valve construction for a storage tank that has a wall means defining a storage compartment therein and an opening therethrough leading from the exterior of said wall means to said storage compartment, said vent valve construction comprising a body member having an annular flange portion for engaging against said wall means around said opening thereof on the exterior thereof and an annular valve seat portion for passing through said opening and being disposed in said storage compartment, a movable valve member carried by said body portion for opening and closing said valve seat portion to and from said storage compartment, said body member having a tubular portion substantially concentrically disposed in said flange portion and said valve seat portion, piston means operatively interconnected to said valve member and being disposed in said tubular portion to define a pressure chamber therein, and spring means operatively associated with said valve member to tend to maintain said valve member in its closed position with said valve seat portion in opposition to the force of any fluid pressure directed to said pressure chamber and tending to move said valve member to its open position, the improvement wherein said tubular portion has opposed open ends one of which is adapted to be disposed in said storage compartment and the other of which is adapted to be accessible from the exterior of said wall means, said valve member having a stem projecting through said one open end of said tubular portion to operatively interconnect said valve member to said piston means, and removable closure means closing said other open end of said tubular portion.

2. A vent valve construction as set forth in claim 1 wherein said piston means is movable relative to said stem of said valve member and is thereby separate from said valve member.

3. A vent valve construction as set forth in claim 2 wherein said stem of said valve member has an annular shoulder means disposed in said tubular portion of said body member, said piston means having an annular shoulder means engageable with said annular shoulder means of said stem to operatively interconnect said piston means to said valve member.

4. A vent valve construction as set forth in claim 3 wherein said annular shoulder means of said stem comprises a substantially flat washer having opposed flat sides, said annular shoulder means of said piston means being engageable with one of said flat sides of said washer.

5. A vent valve construction as set forth in claim 4 and including a threaded fastening member securing said washer to said stem, said threaded fastening member having an enlarged head engaging said one flat side of said washer inboard of said annular shoulder means of said piston means.

6. A vent valve construction as set forth in claim 4 wherein said spring means comprises a coiled compression spring disposed in said tubular portion and having opposed ends one of which engages said tubular portion and the other of which engages the other of said flat sides of said washer.

7. A vent valve construction as set forth in claim 1 wherein said closure means comprises a closure member disposed in said other open end of said tubular portion.

8. A vent valve construction as set forth in claim 7 wherein said closure member is axially movable in said tubular portion within certain limits.

9. A vent valve construction as set forth in claim 8 wherein said tubular portion has a pair of axially spaced apart internal annular shoulder means respectively limiting the axial movement of said closure member therebetween.

10. A vent valve construction as set forth in claim 9 wherein one of said internal annular shoulder means of said tubular portion is removable from said other open end of said tubular portion and is the outermost one of said internal annular shoulder means so that said closure member can be removed after said one internal annular shoulder means is removed.

11. A vent valve construction as set forth in claim 1 wherein said pressure chamber is defined between said closure means and said piston means.

12. A vent valve construction as set forth in claim 11 wherein said closure means comprises a closure member disposed in said other open end of said tubular portion and being axially movable in said tubular portion within certain limits.

13. A vent valve construction as set forth in claim 12 wherein said closure member has annular seal means thereon that seals said closure member to said tubular portion while permitting said limited axial movement thereof.

14. A vent valve construction as set forth in claim 13 wherein said piston means also has annular seal means thereon that seals said piston means to said tubular portion while permitting axial movement of said piston means within said tubular portion.

15. A vent valve construction as set forth in claim 1 wherein said body member has web-like portions extending between said flange portion thereof and said tubular portion and interconnecting the same together.

16. A vent valve construction as set forth in claim 15 wherein said portions of said body member are integral and homogeneous whereby said body member comprises a one-piece member.

17. A vent valve construction as set forth in claim 15 wherein one of said web-like portions has an opening means therethrough and leading to said pressure chamber whereby pressurized fluid can be directed to said pressure chamber through said opening means of said one web-like portion.

18. A vent valve construction as set forth in claim 1 wherein said annular flange of said body member has means for detachably securing said body member to a vent hood or the like.

19. A vent valve construction as set forth in claim 18 wherein said means for detachably securing said body member to a vent hood or the like comprises external thread means on said annular flange portion of said body member.

20. A vent valve construction as set forth in claim 1 wherein said annular valve seat portion of said body member has means for detachably securing said body member to said wall means of said storage compartment.

21. A vent valve construction as set forth in claim 20 wherein sa.id means for detachably securing said body member to said wall means of said storage compartment comprises external thread means on said annular valve seat portion of said body member.

22. A vent valve construction as set forth in claim 21 and including an internally threaded annular member threaded on said threaded valve seat portion of said body member for sandwiching said wall means of said storage compartment between said annular flange portion of said body member and said internally threaded annular member.

23. In a storage tank means that has a wall means defining a storage compartment therein and an opening therethrough leading from the exterior of said wall means to said storage compartment, said tank means having a vent valve construction comprising a body member having an annular flange portion engaging against said wall means around said opening thereof on the exterior thereof and an annular valve seat portion passing through said opening and being disposed in said storage compartment, a movable valve member carried by said body portion for opening and closing said valve seat portion to and from said storage compartment, said body member having a tubular portion substantially concentrically disposed in said flange portion and said valve seat portion, piston means operatively interconnected to said valve member and being disposed in said tubular portion to define a pressure chamber therein, and spring means operatively associated with said valve member to tend to maintain said valve member in its closed position with said valve seat portion in opposition to the force of any fluid pressure directed to said pressure chamber and tending to move said valve member to its open position, the improvement wherein said tubular portion has opposed open ends one of which is disposed in said storage compartment and the other of which is accessible from the exterior of said wall means, said valve member having a stem projecting through said one open end of said tubular portion to operatively interconnect said valve member to said piston means, and removable closure means closing said other open end of said tubular portion.

* * * * *